United States Patent [19]
Leonard

[11] Patent Number: 5,566,964
[45] Date of Patent: Oct. 22, 1996

[54] CONVERTIBLE TOWING DEVICE

[76] Inventor: Rodney L. Leonard, 230 Dulin Rd., Mocksville, N.C. 27028

[21] Appl. No.: 398,219

[22] Filed: Mar. 2, 1995

[51] Int. Cl.⁶ .......................... B62D 53/06; B62D 63/00
[52] U.S. Cl. .................... 280/417.1; 280/416.1; 280/423.1
[58] Field of Search ............... 280/416.1, 415.1, 280/476.1, 416.2, 416.3, 417.1, 423.1, 441.2, 491.4, 491.1

[56] References Cited

U.S. PATENT DOCUMENTS

| | | | |
|---|---|---|---|
| 3,796,443 | 3/1974 | Crutchfield | 280/423.1 X |
| 3,815,936 | 6/1974 | Oaks, Jr. | 280/417.1 |
| 3,840,252 | 10/1974 | Jocoy | 280/417.1 |
| 3,843,161 | 10/1974 | Hastings | 280/423.1 |
| 3,876,674 | 4/1975 | Jenkins | 280/417.1 |
| 3,889,978 | 6/1975 | Kann | 280/417.1 |
| 4,433,853 | 2/1984 | Swaim | 280/417.1 |

FOREIGN PATENT DOCUMENTS 631959   6/1936   Germany ................... 280/491.1

Primary Examiner—Kevin Hurley
Assistant Examiner—F. Zeender
Attorney, Agent, or Firm—Petree Stockton LLP

[57] ABSTRACT

A convertible towing device for use with a towing vehicle equipped with a trailer connector and a trailer having a tongue with a conventional trailer hitch includes a base section connectable to the trailer and a pivot section pivotable on the base section between a rearward position toward the trailer and a forward position toward the towing vehicle and connectable to the towing vehicle in the forward position. The pivot section is adjustably positionable in preselected forward positions and is provided with a connector plate having a king pin for connection to a fifth wheel type connector on the towing vehicle.

10 Claims, 2 Drawing Sheets

CONVERTIBLE TOWING DEVICE

FIELD OF THE INVENTION

The present invention relates to towing devices for use with a towing vehicle and a trailer, and more particularly to a new and improved towing device for use with a towing vehicle having a trailer connector such as a fifth wheel and a trailer such as a dolly having a tongue with a conventional trailer hitch.

DESCRIPTION OF THE PRIOR ART

Various types of towing devices for connecting a trailer to a towing vehicle have been used in the past. For example, the towing vehicle may be equipped with a conventional ball type hitch attached at or under the rear of the towing vehicle, to which a conventional trailer hitch fixed on the end of a tongue extending from the front of the trailer can be connected for towing. Alternatively, a towing vehicle such as a pick-up truck may be equipped with a connector disposed in the bed of truck, to which a goose-neck type tongue extending up from the front of the trailer and then down into the bed of the truck can be connected by means of a corresponding connector for towing.

A third type of towing device is found in over-the-road type tractors equipped with a fifth wheel type connector mounted on a frame above or forward of the rear wheels of the tractor. However, such tractors are specifically designed for towing over-the-road type trailers having a corresponding connector plate disposed in the front of the trailer with a king pin connectable to the fifth wheel of the tractor and cannot be used with a trailer such as a dolly having a conventional trailer hitch. While towing devices have been proposed, for example in U.S. Pat. No. 4,433,853, for converting a trailer having a conventional trailer hitch to a goose-neck type tongue for use with a pick-up truck, such devices cannot be used with an over-the-road type tractor having a fifth wheel type trailer connector.

There is a current need to provide a towing device for use with a towing vehicle having a trailer connector such as a fifth wheel trailer connector mounted on a frame above or forward of the rear wheels of the towing vehicle and with a trailer such as a dolly having a conventional trailer hitch.

The present invention addresses that need and further provides a towing device which can be quickly and easily converted back and forth for use with a towing vehicle having a fifth wheel trailer connector and a towing vehicle having a conventional trailer hitch.

SUMMARY OF THE INVENTION

The general purpose of the present invention, which will be described subsequently in greater detail, is to provide a new and improved convertible towing device for use with a towing vehicle having a trailer connector and a trailer such as a dolly having a tongue which has all of, and more than, the advantages of prior art towing devices and none of the disadvantages.

To attain this purpose, a representative embodiment of the present invention is illustrated in the drawings. The towing device of the present invention makes use of a base section connectable to a trailer and a pivot section pivotable on the base section between a rearward position toward the trailer and a forward position toward the towing vehicle and connectable to the towing vehicle in the forward position. When pivoted to the rearward position, the pivot section rests on and is partly supported by either the base section or a forward part of the trailer, and a portion of the trailer tongue carrying, for example, a conventional trailer hitch extends forward of the base section toward the towing vehicle and can be connected to a towing vehicle having a corresponding conventional trailer hitch, without removal of the towing device of the present invention.

The pivot section has a rear end which is pivoted on a pivot pin mounted on the base section and a front end which is pivotable in an arc over the pivot pin. In order to accommodate, for example, variations in the difference between the height of the trailer tongue and the towing vehicle connector, the pivot section is also adjustably positionable in pre-selected forward positions for connection to the towing vehicle by means of a locking plate associated with the pivot pin, and a locking pin. The pivot section is provided with a hole, the locking plate has a plurality of holes corresponding to the preselected forward positions of the pivot section, and the locking pin is insertable through the hole of the pivot section and into one of the pre-positioned holes of the locking plate. The pivot section is connectable to the towing vehicle in one of the pre-selected forward positions of the pivot section by means of a connector plate disposed on the pivot section. For connection to a fifth wheel type connector of a towing vehicle, the connector plate is provided with a king pin receivable by the fifth wheel connector.

Preferably, the base section includes a substantially horizontally disposed structure and a substantially vertically disposed upstanding structure, and the pivot pin and associated locking plate are disposed on the vertically disposed upstanding structure. For connecting the base section to the trailer, the base section is provided with a front bracket and a rear bracket which cooperatively receive the trailer tongue. The front and rear brackets may each be provided with holes, and the trailer tongue may be provided with corresponding holes, for receiving fasteners such as bolts to secure the respective brackets to the tongue.

The pivot section may include a pair of spaced apart pivot section side members, each having a front end to which the connector plate is fixed, and each having a rear end. Further, a pair of the pivot pins and a pair of the associated locking plates may be provided, with the pivot section side member rear ends pivoted on respective of the pivot pins. Likewise, the base section horizontally disposed structure may include a pair of spaced apart base section horizontal side members, each having a front end and a rear end, and a rear cross member connecting the horizontal side member rear ends, with the rear bracket fixed to the rear cross member.

The base section upstanding section may include a pair of spaced apart vertical side members, each having a bottom end connected to respective of the horizontal side member front ends, and each having a top end on which respective of the pivot pins and associated locking plates are positioned. The base section upstanding section may also include a front cross member connecting the vertical side members, with the front bracket fixed to the front cross member.

This outline focusses on the more important features of the invention in order that a detailed description which follows may be better understood and in order that the present contribution to the art may be better appreciated. There are, of course, additional features of the invention that will be described hereinafter and which will form the subject matter of the claims appended hereto. It is to be understood that the invention is not limited in its application to the details of construction and to the arrangement of the components set forth in the following description and drawings. The invention is capable of other embodiments and of being practiced and being carried out in various ways.

It is to be further understood that the phraseology and terminology employed herein are for the purpose of description and are not to be regarded as limiting. Those skilled in the art will appreciate that the conception upon which this disclosure is based may readily be utilized as a basis for designing the structures, methods and systems for carrying out the several purposes of the present invention. The claims are regarded as including such equivalent constructions so long as they do not depart from the spirit and scope of the present invention.

From the foregoing, it is apparent that an object of the present invention is to provide a new and improved towing device for use with a towing vehicle having a trailer connector such as a fifth wheel trailer connector mounted on a frame above or forward of the rear wheels of the towing vehicle and with a trailer such as a dolly having a conventional trailer hitch.

It is another object of the present invention to provide a towing device which can be quickly and easily converted back and forth for use with a towing vehicle having a fifth wheel trailer connector and a towing vehicle having a conventional trailer hitch.

It is a further object of the present invention to provide a new and improved design of a convertible towing device that is more reliable, functional and safe to use and maintain and less expensive than those presently available.

These, together with other objects of the present invention, along with the various features of novelty which characterize the invention, are pointed out with particularity in the claims annexed to and forming a part of this disclosure. For a better understanding of the invention, its operating advantages, and the specific objectives attained by its uses, reference should be made to the accompanying drawings in which like characters of reference designate like parts throughout the several views.

BRIEF DESCRIPTION OF THE DRAWINGS

The invention will be better understood and objects other than those set forth above will become apparent when consideration is given to the following detailed description. Such description makes reference to the annexed drawings wherein.

DESCRIPTION OF THE PREFERRED EMBODIMENT

Figure 1:
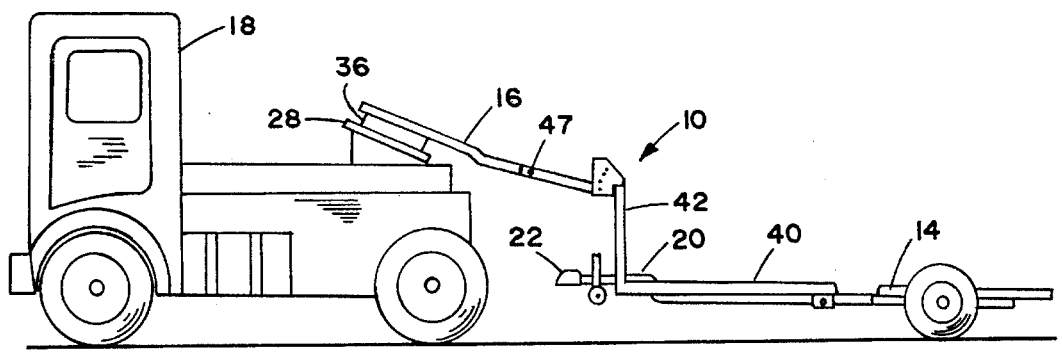
FIG. 1 is a side elevational view of a towing vehicle towing a trailer using the towing device of the present invention.
Figure 3:
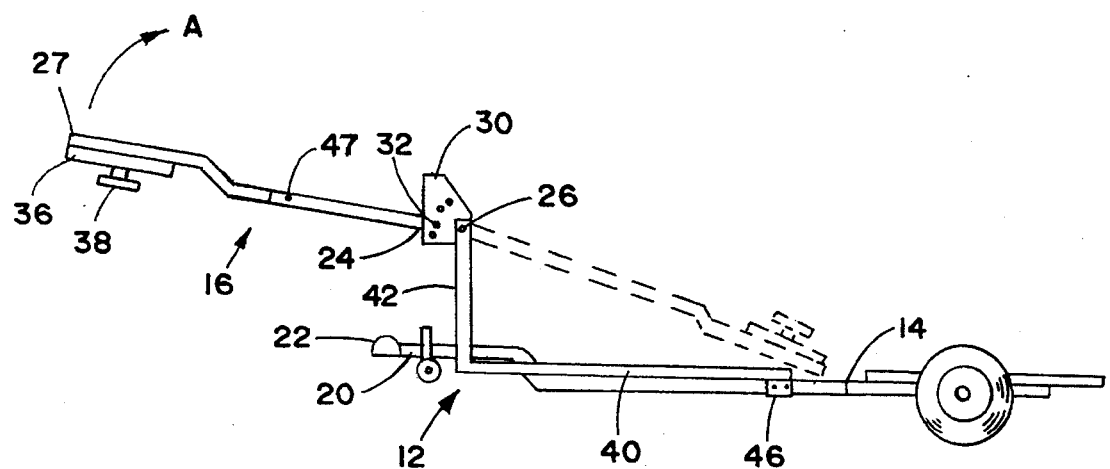
FIG. 3 is a side elevational view of the towing device shown in FIG. 2.

Referring now to the drawings, the towing device of the present invention, shown generally as 10 in FIG. 1, has a base section, shown generally as 12 in FIG. 3, connectable to a trailer 14 and a pivot section, shown generally as 16 in FIG. 3, pivotable on base section 12 between a rearward position toward trailer 14 as shown in FIG. 3 and a forward position toward a towing vehicle 16 and connectable to towing vehicle 18 in the forward position as shown in FIG. 1. When pivoted to the rearward position, pivot section 16 rests on and is partly supported by either base section 12 or a forward part of trailer 14 as shown in FIG. 3, and a forward part of trailer tongue 20 carrying a conventional trailer hitch 22 extends forward of base section 12 and can be connected to a towing vehicle having a corresponding conventional trailer hitch (not shown) without removal of the towing device of the present invention.

Pivot section 16 has a rear end 24 which is pivoted on a pivot pin 26 mounted on base section 12 and a front end 27 which is pivotable in an arc in arrow direction "A," as shown in FIG. 3, over pivot pin 26. In order to accommodate, for example, variations in the difference between the height of the trailer tongue 20 and the towing vehicle connector 28 as shown in FIG. 1, pivot section 16 is adjustably positionable in pre-selected forward positions for connection to towing vehicle 18 by means of a locking plate 30 associated with pivot pin 26, and a locking pin 32. Pivot section 16 is provided with a hole, locking plate 30 has a plurality of pre-positioned holes 34 corresponding to the pre-selected forward positions of pivot section 16, and locking pin 32 is insertable through the hole of pivot section 16 and into one of 19 pre-positioned holes 34 of locking plate 30. Pivot section 16 is connectable to towing vehicle 18 by means of a connector plate 36 disposed on pivot section 16. For connection to trailer connector 28, connector plate 36 is provided with a king pin 38 as shown in FIG. 3 which is receivable by trailer connector 28.

Figure 2:
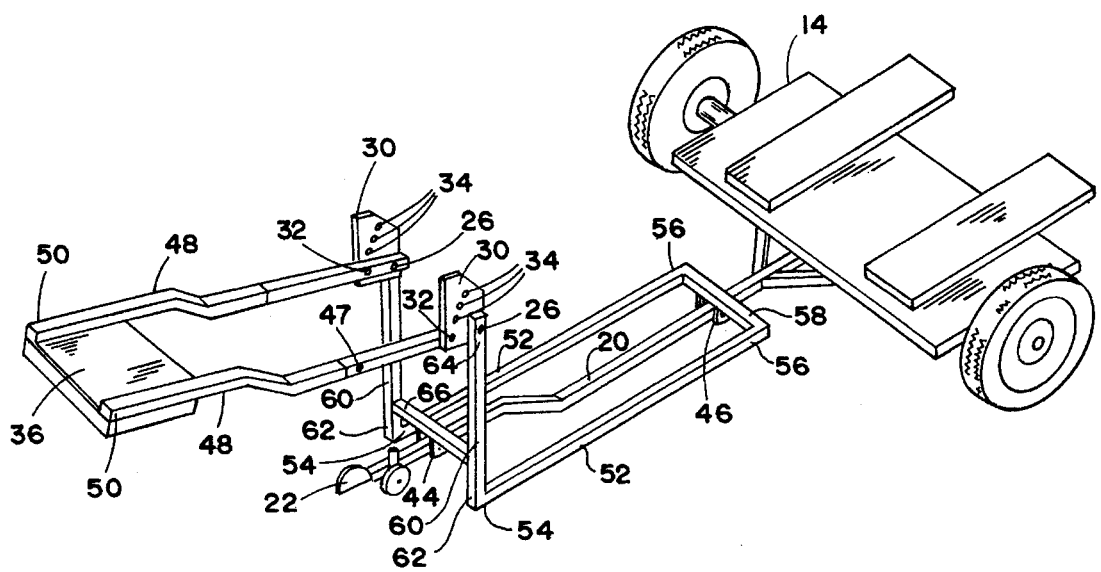
FIG. 2 is a perspective view of the towing device shown in FIG. 1 connected to a trailer.

Base section 12 includes a substantially horizontally disposed structure 40 and a substantially vertically disposed upstanding structure 42, as shown in FIGS. 1 and 3, and pivot pin 26 and associated locking plate 30 are disposed on vertically disposed upstanding structure 42. For connecting base section 12 to trailer 14, base section 12 is provided with a front bracket 44 and a rear bracket 46 for cooperatively receiving trailer tongue 20 as shown in FIG. 2. Front and rear brackets 44, 46 are provided with holes, and trailer tongue 20 is provided with corresponding holes, for receiving fasteners such as bolts to secure the respective brackets 44, 46 to trailer tongue 20.

Figure 4:
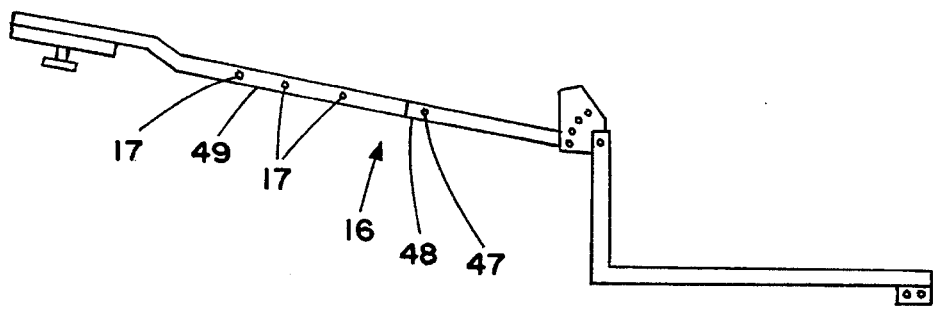
FIG. 4 is a side elevational view of the towing device shown in FIG. 2 in and extended position of the telescoped portion of the pivot side section members.

Pivot section 16 includes a pair of spaced apart pivot side section members 48, each having a front end 50 to which connector plate 36 is fixed. Preferably, a pair of pivot pins 26 and a pair of associated locking plates 30 are provided, as shown in FIG. 2, with pivot section side member rear ends 24 pivoted on respective pivot pins 26. Referring to FIG. 4, pivot side section members 48 may include telescoping portions 49, enabling lengthening or shortening of pivot side section members 48 by extending or retracting telescoping portion 49 to accommodate variations in dimensions and configuration of towing vehicle 16 relative to trailer tongue 20. Telescoping portions 49 are extendable in increments corresponding to positions of holes 17 formed in telescoping portions 49 for receiving a pin 47 through a corresponding hole formed in each of pivot side section members 48. Base section horizontally disposed structure 40 includes a pair of spaced apart base section horizontal side members 52, each having a front end 54 and a rear end 56, and a rear cross member 58 connecting horizontal side member rear ends 56, with rear bracket 46 fixed to rear cross member 58.

Base section upstanding section 42 includes a pair of spaced apart vertical side members 60, each having a bottom end 62 connected to respective horizontal side member front ends 54, and each having a top end 64 on which respective pivot pins 26 and associated locking plates 30 are positioned. Base section 12 also includes a front cross member 66 connecting vertical side members 60, with front bracket 44 fixed to front cross member 66.

Obviously, any number of materials may be used to form the device of the present invention and its components described herein, and success has been experienced by use of metal, including angle iron for certain of the component parts, but other materials may be utilized with equal success.

With respect to the descriptions set forth above, optimum dimensional relationship for the parts of the invention (to include variations in size, materials, shape, form, function and manner of operation, assembly and use) are deemed readily apparent and obvious to those skilled in the art, and all equivalent relationships to those illustrated in the drawings and described in the specification are intended to be encompassed herein. The foregoing is considered as illustrative only of the principles of the invention. Since numerous modifications and changes will readily occur to those skilled in the art, it is not intended to limit the invention to the exact construction and operation shown and described, and all suitable modifications and equivalents falling within the scope of the appended claims are deemed within the present inventive concept.

What is claimed is:

1. A convertible towing device for use with a towing vehicle having a trailer connector and a trailer having a tongue comprising:

a base section;

means for connecting the base section to said trailer;

a pivot section pivoted on pivot means disposed on the base section and pivotable between a rearward position toward the trailer and a forward position toward said towing vehicle; and means for connecting the pivot section to the towing vehicle in the forward position; said pivot section being adjustably positionable in pre-selected forward positions for connection to said towing vehicle, and said pivot means further comprising means for adjustably positioning said pivot section in one of the pre-selected forward positions; said pivot means comprising a pivot pin mounted on said base section, and said pivot section having a front end and a rear end, wherein the pivot section rear end is pivoted on the pivot pin and the pivot section front end is pivotable over the pivot pin; and said pivot section having portions defining a hole, and said adjustable positioning means comprising a locking plate associated with said pivot pin and having portions defining a plurality of pre-positioned holes corresponding to said pre-selected forward positions of the pivot section and a locking pin insertable through the pivot section hole and into one of said pre-positioned holes of the locking plate.

2. The towing device according to claim 1, said pivot section connecting means comprising a connector plate disposed on said pivot section and connectable to said trailer connector.

3. The towing device according to claim 2, said base section comprising a substantially horizontally disposed structure and a substantially vertically disposed upstanding structure, and said pivot pin and said locking plate are disposed on said vertically disposed upstanding structure.

4. The towing device according to claim 3, said base section connecting means comprising a front bracket and a rear bracket disposed on said base section for cooperatively receiving said trailer tongue for connection.

5. The towing device according to claim 4, said pivot section comprising a pair of spaced pivot section side members, each having a front end supporting said connector plate and each having a rear end, and further comprising a pair of said pivot pins and associated locking plates, wherein said side member rear ends are pivoted on respective of said pivot pins.

6. The towing device according to claim 5, said base section horizontally disposed structure comprising a pair of spaced base section horizontal side members, each having a front end and a rear end, and a rear cross member connecting the horizontal side member rear ends, wherein said rear bracket is disposed on the rear cross member.

7. The towing device according to claim 6, said base section upstanding section comprising a pair of spaced vertical side members, each having a bottom end connected to respective of said horizontal side member front ends and each having a top end, wherein respective of said pivot pins and associated locking plates are positioned on the vertical side member top ends.

8. The towing device according to claim 7, said base section upstanding section further comprising a front cross member connecting said vertical side members, wherein said front bracket is disposed on the front cross member.

9. The towing device according to claim 8, said connector plate having a king pin receivable by said trailer connector.

10. The towing device according to claim 9, wherein said pivot section side members are each telescoped to enable extension and retraction of the pivot section side members.

* * * * *